United States Patent [19]

McGarry et al.

[11] Patent Number: 5,035,112
[45] Date of Patent: Jul. 30, 1991

[54] NON-CONTINUOUS IGNITION TRAIN

[75] Inventors: John M. McGarry; Howard S. Dilts, both of San Jose; Nils O. Langenborg, Sunnyvale, all of Calif.

[73] Assignee: The United States of America as represented by the Secretary of the Navy, Washington, D.C.

[21] Appl. No.: 446,833

[22] Filed: Dec. 3, 1982

[51] Int. Cl.$^5$ .......................... F02K 7/18; F02K 9/95
[52] U.S. Cl. ................................. 60/39.823; 60/245; 60/256
[58] Field of Search ............... 60/39.821, 39.823, 245, 60/250, 251, 256, 270.1, 271; 102/352, 380; 89/1.813

[56] References Cited

U.S. PATENT DOCUMENTS

| 2,976,680 | 3/1961 | Kobbeman | 60/35.6 |
|---|---|---|---|
| 2,987,875 | 6/1961 | Fox | 60/245 |
| 3,000,306 | 9/1961 | Wenzel et al. | 60/245 |
| 3,084,504 | 4/1963 | McKinnon | 60/39.823 |
| 3,173,252 | 3/1965 | Ziegenhagen | 60/35.6 |
| 3,273,335 | 9/1966 | Gravlin et al. | 60/256 |
| 3,529,418 | 9/1970 | Puckett et al. | 60/39.09 |
| 3,547,031 | 12/1970 | Black et al. | 102/49.7 |
| 3,855,789 | 12/1974 | Platzek | 60/245 |

Primary Examiner—Stephen C. Bentley
Attorney, Agent, or Firm—Sol Sheinbein; Melvin J. Sliwka

[57] ABSTRACT

A pyrotechnic ignition train for use in dual nozzle rocket-ramjet missiles wherein a donor device and a receptor charge in the train allow transfer of a pyrotechnic impulse across an air gap between an outer nozzle and an inner concentric nozzle to allow ignition of the rocket motor. Upon consumption of the rocket fuel the inner nozzle is jettisoned, and the ramjet motor fired. Absence of physical connection of the nozzles at the ignition train allows easy separation of the inner nozzle from the missile.

8 Claims, 1 Drawing Sheet

NON-CONTINUOUS IGNITION TRAIN

BACKGROUND OF THE INVENTION

1. Field of the Invention

The present invention relates to the field of pyrotechnics. More particularly the present invention relates to an ignition train system for activation of propellants. Still more particularly, but without limitation thereto the present invention relates to an ignition train for use in integral rocket-ramjets.

2. Description of the Prior Art

Pyrotechnic ignition trains for rockets and missiles are known in the prior art. These systems are applicable to single-nozzle rockets where an ignition train is routed through the nozzle body. The development of combination rocket-ramjet propelled missiles has presented new requirements in ignition train design since dual nozzles are required, i.e., a rocket nozzle, which is eventually rejected, resting inside a larger ramjet nozzle. Prior art ignition train designs would require routing the pyrotechnic lines through the nozzle opening. Ramjet booster rocket propellants in most instances must be ignited from the aft end, with ignition lines located externally to the missile, i.e., lines looped outside and into the rocket nozzle via the exit area which are undesirable as impeding separation of the rocket nozzle. It is also common practice to provide a safe-arming device in the ignition train to preclude accidental firing due to stray or remote electrical signals This device can be placed in the rocket nozzle throat, however, this placement is undesirable since minimum debris upon ignition is desired for personnel safety and the safe-arm device could contribute to such debris.

SUMMARY OF THE INVENTION

It is an object of the present invention to provide a pyrotechnic ignition train for use in dual nozzle rocket-ramjet missiles.

It is a further object of this invention to provide a pyrotechnic ignition train for use in dual nozzle rocket-ramjet missiles having no physical connection between nozzles so as to allow inner nozzle separation without excessive pressure requirements, which result from the need to shear off any ignition conduits or ignition trains.

It is yet a further object of this invention to provide an ignition train for a dual nozzle rocket-ramjet missile wherein the safe-arm device would not provide a source of debris.

These and other objects are achieved in the present invention wherein an electrical squib ignites a pyrotechnic train which passes the impetus directly to a donor device or to a pyrotechnic junction box which routes the impetus to a donor device. The impetus from the donor is transmitted across the air gap between the ramjet nozzle and the rocket nozzle and is picked up by a receiver charge which transmits the impetus to a pressure sealing initiator (not an electroexplosive device) thereby igniting the rocket motor igniter.

DESCRIPTION OF THE PREFERRED EMBODIMENT

Figure 1:
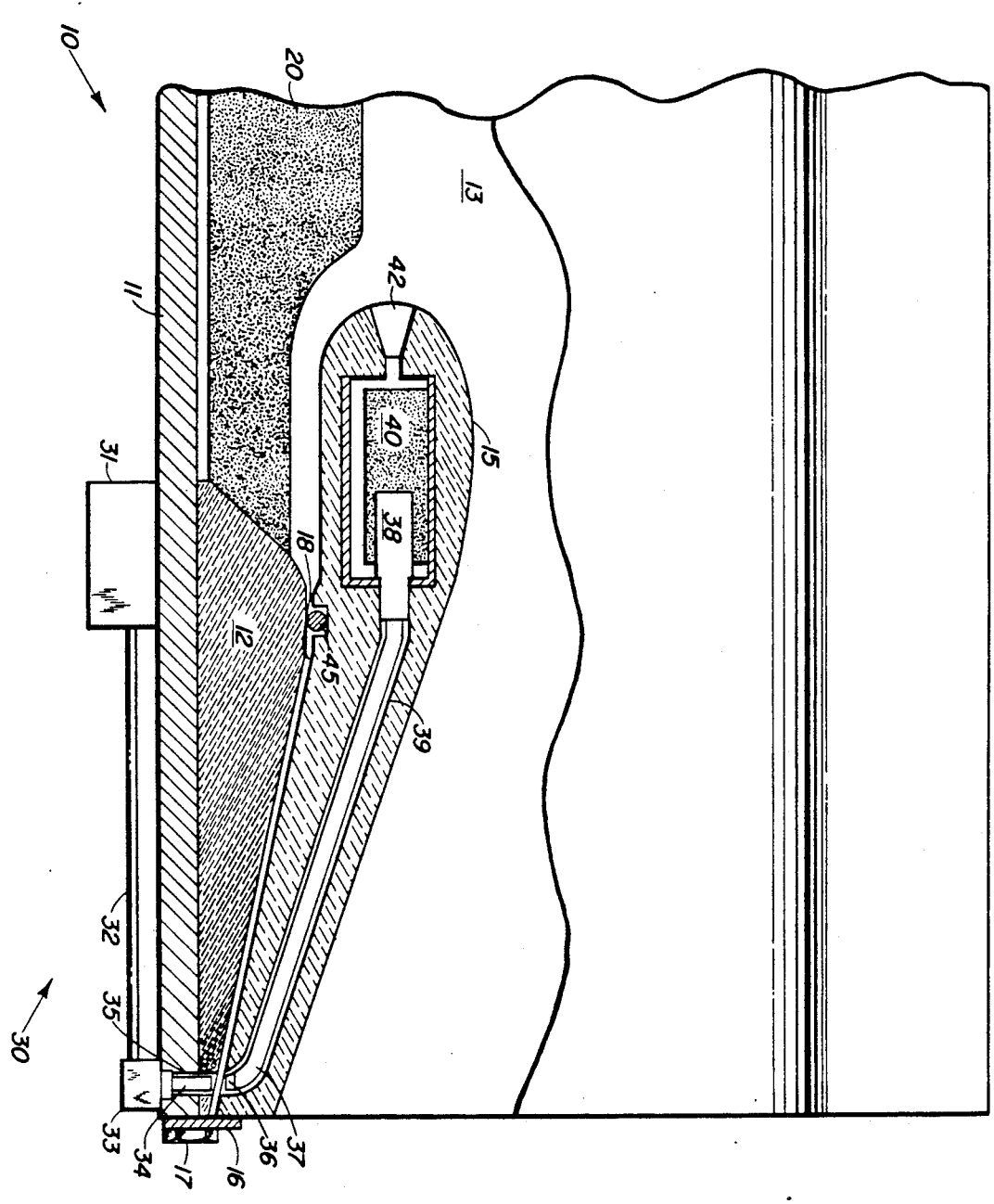
FIG. 1 is a longitudinal sectional view of the aft portion of a combined rocket-ramjet propelled missile illustrating the pyrotechnic ignition train of the present invention.

Referring to FIG. 1 missile 10 is shown having chamber wall 11. Secondary nozzle 12 is located adjacent the aft portion of wall 11 and is operative to restrict gas flow from pressure combustion 13 during ramjet operation. Primary nozzle 15 is located concentrically within secondary nozzle 12 and is held in place by retaining ring 16 and explosive bolts 17, primary nozzle 15 and secondary nozzle 12 defining annular air gap 18 therebetween. Primary nozzle 15 is operative to restrict gas flow from high pressure combustion 13 during rocket operation, i.e., during burning of rocket propellant 20. Pyrotechnic ignition train 30 includes safe-arm device 31, pyrotechnic lead 32, unction box 33, donor device 34, receptor charge 36, pyrotechnic lead 37, pressure sealing initiator 38, and rocket motor igniter 40. Donor device 34 is located in bore 35 within wall 10 and secondary nozzle 12. Receptor charge 36 and lead 37 are located in bore 39 within primary nozzle 15. Bore 42 in primary nozzle 15 allows hot gases from igniter 40 to flow to rocket motor propellant 20 to ignite same.

During operation safe-arm device 31 is moved to the armed position. An electrical squib or equivalent initiator (not shown) ignites pyrotechnic train 30 and the impetus passes through pyrotechnic lead 32 directly to ignite donor device 34 or to junction box 33 to ignite donor device 34. Donor device 34 then initiates receptor charge 36 across air gap 18, the impetus from receptor charge 36 travelling through pyrotechnic lead 37 to pressure sealing initiator 38 and rocket motor igniter 40 thus igniting rocket motor propellant 20. Upon completion of consumption of rocket motor propellant 20, explosive bolts 17 are activated causing release of retaining ring 16 which allows jettison of primary nozzle 15 from missile 10 whereby the missile is operated in ramjet mode with secondary nozzle 12 acting as the exit gas restrictor.

In the embodiment shown, primary nozzle 15 is positioned by means of retaining ring 16 and seal 45 and is capable of being rotated within secondary nozzle 12 between a position where bores 35 and 39 are aligned and positions where the bores 35 and 39 are not aligned. Donor device 34 is effective in providing impetus to receptor charge 36 only when bores 35 and 39 are substantially aligned so capability of rotation of primary nozzle 15 between a nonaligned and aligned positions provides an additional safe-arm feature to the missile system and is thus a significant safety feature.

The novel design of the invention thus provides advantageous and significant features including provision for non-continuous design having an air gap with no physical connection to impede jettison of the rocket nozzle. The design permits the ramjet and rocket elements to be independently constructed and then assembled when desired. The novel design permits placing the safe-arm device at any convenient location in the missile and thus avoids ignition debris from such a device.

The design of the invention provides an added safety-arming feature by rotation capability of the primary nozzle with respect to the secondary nozzle.

Obviously many modifications and variations of the present invention are possible in the light of the above teachings. It is therefore to be understood that within the scope of the appended claims the invention may be practiced otherwise than as specifically described.

We claim:

1. A rocket-ramjet nozzle device attached to a motor pressure vessel, operating initially as a rocket and subsequently as a ramjet, comprising:
    a secondary nozzle attached to said vessel for directing a flow of exhaust gases during ramjet operation;
    a primary nozzle mounted within said secondary nozzle defining an air gap mounted therebetween, said primary nozzle for directing a flow of exhaust gases during rocket operation;
    means for ejecting said primary nozzle from said secondary nozzle;
    safe-arming means; and
    a pyrotechnic igniter, located between said safe-arming means and said primary nozzle, composed of a squib which detonates upon a command signal, a donor device located within a a wall of said secondary nozzle;
    a first pyrotechnic ignition lead penetrating said secondary nozzle wall for carrying a pyrotechnic impulse from said squib to said donor device, said donor device being capable of initiating a pyrotechnic impulse jumping said air gap, a receptor charge capable of initiating a pyrotechnic impulse upon receiving said pyrotechnic impulse from said donor device said receptor charge being located within a wall of said primary nozzle, a pressure sealing initiator capable of initiating a pyrotechnic impulse upon receipt of an impulse from said receptor, charge, a second pyrotechnic ignition lead penetrating said primary nozzle wall for carrying said pyrotechnic impulse from said receptor charge to said pressure sealing initiator, and a rocket motor igniter, said rocket motor igniter being capable of igniting rocket propellant within said motor pressure vessel upon receiving a pyrotechnic impulse from said pressure sealing initiator.

2. A rocket-nozzle device according to claim 1 wherein said primary nozzle and said secondary nozzle are generally conical in shape.

3. A rocket-ramjet nozzle device according to claim 1 wherein said primary nozzle is mounted within said secondary nozzle by means of a retaining ring adjacent the aft end of said primary nozzle.

4. A rocket-ramjet nozzle device according to claim 3 further comprising explosive bolts for attachment of said retaining ring to said motor pressure vessel.

5. A rocket-ramjet nozzle device according to claim 4 further comprising an "O" ring seal disposed between said primary nozzle and said secondary nozzle near the forward end thereof further defining said air gap and sealing said gap from communication with the interior of said motor pressure vessel.

6. A rocket-ramjet nozzle device according to claim 1 wherein said first pyrotechnic ignition lead is mounted exterior to said pressure vessel and further comprising a pyrotechnic junction box located between said first pyrotechnic lead and said donor device at the wall of said pressure vessel so as to transfer a pyrotechnic impulse from said first pyrotechnic ignition lead through the wall of said pressure vessel to said donor device.

7. A rocket-ramjet nozzle device according to claim 6 wherein said pyrotechnic junction box is located near the aft end of said pressure vessel at the low pressure region thereof and said second pyrotechnic ignition lead is directed within said primary nozzle wall from a point near the aft end thereof corresponding to the location of said junction box, to the forward end thereof, said pressure sealing initiator and said rocket motor igniter being located near the forward end of said primary nozzle.

8. A rocket-ramjet nozzle device according to claim 7 wherein said primary nozzle is axially rotatable within said secondary nozzle such that in at least one rotation position said receptor charge is displaced from the vicinity of said donor device such that said pyrotechnic igniter is in a safe condition, and in another position, said receptor charge is aligned with said donor device such that said pyrotechnic igniter is in an armed condition.

* * * * *